US012152417B2

(12) United States Patent
Wieczorek

(10) Patent No.: US 12,152,417 B2
(45) Date of Patent: Nov. 26, 2024

(54) VEHICLE STORAGE COMPARTMENT LATCH ASSEMBLIES WITH SHAPE MEMORY ALLOY ACTUATOR

(71) Applicant: Motherson Innovations Company Limited, London (GB)

(72) Inventor: Romeo Wieczorek, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 192 days.

(21) Appl. No.: 18/001,904

(22) PCT Filed: Jun. 28, 2021

(86) PCT No.: PCT/EP2021/067655
§ 371 (c)(1),
(2) Date: Dec. 15, 2022

(87) PCT Pub. No.: WO2021/260224
PCT Pub. Date: Dec. 30, 2021

(65) Prior Publication Data

US 2023/0235601 A1 Jul. 27, 2023

Related U.S. Application Data

(60) Provisional application No. 63/044,380, filed on Jun. 26, 2020.

(51) Int. Cl.
*E05B 81/18* (2014.01)
*E05B 51/00* (2006.01)
(Continued)

(52) U.S. Cl.
CPC ............ *E05B 81/18* (2013.01); *E05B 51/005* (2013.01); *E05B 79/20* (2013.01); *E05B 81/04* (2013.01);
(Continued)

(58) Field of Classification Search
CPC ...... E05B 51/005; E05B 47/009; E05B 81/18; E05B 81/28; E05B 81/50; E05B 79/20;
(Continued)

(56) References Cited

U.S. PATENT DOCUMENTS 6,279,869 B1 * 8/2001 Olewicz .................. F16K 7/045 251/9
6,494,225 B1 * 12/2002 Olewicz .................. F16K 7/045 251/9
(Continued)

FOREIGN PATENT DOCUMENTS

CN 101084393 A * 12/2007 ......... E05B 47/0009
DE 102014106846 A1 * 11/2014 ............. B60K 15/05
(Continued)

OTHER PUBLICATIONS

International Search Report and Written Opinion dated Sep. 9, 2021 of International application No. PCT/EP2021/067655.

*Primary Examiner* — Christine M Mills
*Assistant Examiner* — Noah Horowitz
(74) *Attorney, Agent, or Firm* — Jones Day

(57) ABSTRACT

The present disclosure refers to a latch assembly including a locking bar configured to be movable into (i) an engaged configuration with a storage compartment which enables an access door to be placed and held into a closed position and (ii) a disengaged configuration with the storage compartment in a vehicle to be placed into an opened position and a shape memory alloy (SMA) actuator. The SMA actuator comprises an SMA wire guided around a conductive pulley, and the SMA actuator is configured to move the locking bar into the disengaged configuration and permit the access door of the storage compartment in the vehicle to open. The present disclosure also refers to vehicle storage compart-
(Continued)

ment with such a latch assembly and a method of activation and deactivation of such a latch assembly.

20 Claims, 6 Drawing Sheets

(51) Int. Cl.

| | |
|---|---|
| ***E05B 79/20*** | (2014.01) |
| ***E05B 81/04*** | (2014.01) |
| ***E05B 81/28*** | (2014.01) |
| ***E05B 81/50*** | (2014.01) |
| ***E05B 81/56*** | (2014.01) |
| ***E05B 83/30*** | (2014.01) |

(52) U.S. Cl.
CPC .............. *E05B 81/28* (2013.01); *E05B 81/50* (2013.01); *E05B 81/56* (2013.01); *E05B 83/30* (2013.01)

(58) Field of Classification Search
CPC .......... E05B 83/28; E05B 83/30; E05B 83/32; E05B 83/36
See application file for complete search history.

(56) References Cited

U.S. PATENT DOCUMENTS

| | | | | |
|---|---|---|---|---|
| 7,500,704 | B2 * | 3/2009 | Herrera | B60R 7/06 296/37.12 |
| 9,970,564 | B2 * | 5/2018 | Dankbaar | B60N 2/976 |
| 11,633,631 | B1 * | 4/2023 | Cunningham | A62B 7/08 128/204.18 |
| 11,959,313 | B2 * | 4/2024 | Wieczorek | E05B 83/30 |
| 2008/0007081 | A1 * | 1/2008 | Shibata | E05B 47/0009 70/158 |
| 2014/0339265 | A1 * | 11/2014 | Marone | F03G 7/065 337/140 |
| 2022/0055722 | A1 * | 2/2022 | Gummin | B63C 9/1255 |

FOREIGN PATENT DOCUMENTS

| | | |
|---|---|---|
| DE | 20 2013 007862 | 12/2014 |
| EP | 1347132 | 9/2003 |
| EP | 3132962 | 2/2017 |
| WO | WO 2016/156283 | 10/2016 |
| WO | WO 2020/109622 | 6/2020 |

* cited by examiner

VEHICLE STORAGE COMPARTMENT LATCH ASSEMBLIES WITH SHAPE MEMORY ALLOY ACTUATOR

CROSS-REFERENCE TO RELATED APPLICATIONS

This application is a National-Stage Entry of International Patent Application No. PCT/EP2021/067655 filed on Jun. 28, 2021, which claims the benefit of priority to U.S. Provisional Patent Application No. 63/044,380, filed on Jun. 26, 2020, each of which is incorporated by reference in its entirety for all purposes.

BACKGROUND

1. Field

The present disclosure relates generally to latch assemblies in vehicles and, more specifically, to vehicle storage compartment latch assemblies with at least one shape memory alloy (SMA) actuator. In detail, the present disclosure relates to a latch assembly, in particular a vehicle storage compartment latch assembly, according to the preamble of claim 1, a vehicle storage compartment with such a latch assembly and a method of activation and deactivation of such a latch assembly.

2. Related Art

Vehicles, such as passenger cars, vans and trucks, typically include various storage compartments, such as glove boxes or other storage compartments, capable of receiving various articles to be stored therein. For security purposes, it is often desirable to be able to lock an access door of such storage compartments when closed. For example, in such instances where vehicle windows are left unattended in a lowered position, a vehicle roof/convertible top is left unattended in a retracted/lowered position or a vehicle is broken into by a perpetrator, it is particularly advantageous for an access door of a storage compartment to be locked and remain locked when closed.

Access doors of storage compartments in vehicles typically include latch assemblies that are moveable into engaged and disengaged configurations that make it possible for the access door to be placed into respective closed and opened positions. Furthermore, some access doors of storage compartments in vehicles include latch assemblies with locking mechanisms that are manually lockable and unlockable by way of inserting and using a vehicle key. For example, when a locking mechanism of a latch assembly of an access door is manually locked by way of inserting and using a vehicle key when the access door is in a closed position, the latch assembly is not permitted to be moved into the disengaged configuration and therefore locks and retains the access door of the storage compartment into the closed position. As such, when the access door of the storage compartment is manually locked into the closed position, access into the storage compartment in the vehicle is prohibited.

However, the need to manually lock and unlock an access door of a storage compartment in a vehicle poses certain challenges and limitations. Besides requiring the extra manual steps of inserting and using a vehicle key to lock and unlock an access door of a storage compartment, a driver or passenger in a vehicle may not remember to manually lock the access door once again after being unlocked and placed back into a closed position. As such, access into the storage compartment may remain permissible, even though the driver or passenger may not be aware of this. Additionally, a driver or passenger in a vehicle, and particularly a driver sitting in a driver's seat, may find it inconvenient to lean over towards the access door of the storage compartment (e.g. a glove box) with a vehicle key to manually lock, unlock and/or open the access door, especially in larger vehicles.

EP 3 132 962 B 1 discloses a flap or a glove compartment lid with an unlocking device with an actuator having a shape memory material. The SMA actuator can be placed directly at the flap and can change the shape along its longitudinal axis to drive a movable safety part.

A latch assembly, in particular a vehicle storage compartment latch assembly, according to the preamble of claim 1 is known from WO 2020/109622 A2.

With at least the aforementioned challenges and limitations in mind, there is a continuing unaddressed need to economically provide drivers or passengers the ability to automatically lock and unlock an access door of a storage compartment in a vehicle, thus not requiring the insertion and use of a vehicle key to manually lock and unlock the access door. Furthermore, there is a continuing unaddressed need to economically provide drivers or passengers the ability to open an access door of a storage compartment automatically, after the access door has been placed in a closed position, without needing to directly touch or make physical contact with any portion of the access door.

Several challenges exist for implementing Shape Memory Alloy (SMA) latches for use in a vehicle storage compartment. The SMA actuator typically has a limited installation space that can restrict the force and distance to open the latch. An SMA wire length is often dictated by the design of the storage compartment which may lead to a lack of power in the system and limits optimization of the voltage and power due to the specified internal resistances of the SMA wire. The limited installation space may also affect the time to dissipate generated heat. If the SMA wire cools too slowly, the time to reset the latch assembly may be too long to provide an effective latching system. The power and the cooling parameters are counterproductive and when one parameter is optimized, the other parameter is negatively impacted. Another concern is the voltage requirement that is available to draw from the vehicle electrical system by the SMA actuator system.

SUMMARY

It is the object of the present disclosure to further develop the known latch assembly to overcome the drawback of the prior art. In particular it is the object to optimize the SMA wire for both cooling and power in a limited space.

This object is achieved with the features of the characterizing portion of claim 1. Preferred latch assemblies of this disclosure are described in claims 2 to 14. The present disclosure also provides a vehicle storage compartment with such a latch assembly in line with claim 15 and a method of activation and deactivation of such a latch assembly in line with claims 16 to 20.

The latch assembly includes a locking bar movable into (i) an engaged configuration with a storage compartment which enables an access door to be placed and held into a closed position and (ii) a disengaged configuration with the storage compartment in a vehicle to be placed into an opened position and a shape member alloy (SMA) actuator. The SMA actuator includes a SMA wire guided around a translatable conductive pulley where the SMA actuator is configured to move the locking bar between an engaged and disengaged position. The SMA wire has a first end and a second end connected to an electrical contact and the translatable conductive pulley is at the approximate midpoint of the SMA wire. The first and second end at the electrical contact are positive terminals and the translatable conductive pulley is a negative terminal. This create a first electrical circuit between the SMA wire first end and the conductive pulley and a second electrical circuit between the SMA wire second end and the conductive pulley. The voltage utilized for the first and second wire circuits is between 9 and 16 Volts.

The SMA actuator becomes electrically energized when power is supplied to a plate and the conductive pulley is in electrical contact with the plate. The SMA actuator becomes electrically de-energized when the conductive pulley is translated off the plate. The SMA actuator may become electrically energized upon a user-initiated input from a key fob, an HMI screen and/or a button to provide a signal to initiate energizing or de-energizing of the at least one SMA actuator. A switch may also be used to initiate energizing or de-energizing of the SMA actuator.

A method of activation and deactivation of the SMA actuator includes electrically charging a plate where a conductive pulley in operably attachment to a locking bar is electrically energized when in contact with the plate. The pulley creates a first electrical circuit between the conductive pulley and a first end of an SMA wire and a second electrical circuit between the conductive pulley and the second end of the SMA wire upon power received by the conductive pulley. When power is received by the first and second electrical circuits, the SMA wire shortens translating the conductive pulley off the plate interrupting power to the conductive pulley. The activation and deactivation of the SMA actuator may include an electronic control unit (ECU) to detect the conductive pulley losing electrical contact with the plate and deactivating power supplied to the plate. The system may also include a switch for detecting the translation of the conductive pulley and/or the locking bar 27 to deactivate power to the plate.

It should be noted that the features set out individually in the following description may be combined with each other in any technically advantageous manner and set out other forms of the present disclosure. The description further characterizes and specifies the present disclosure in particular in connection with the Figures.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

Figure 1:
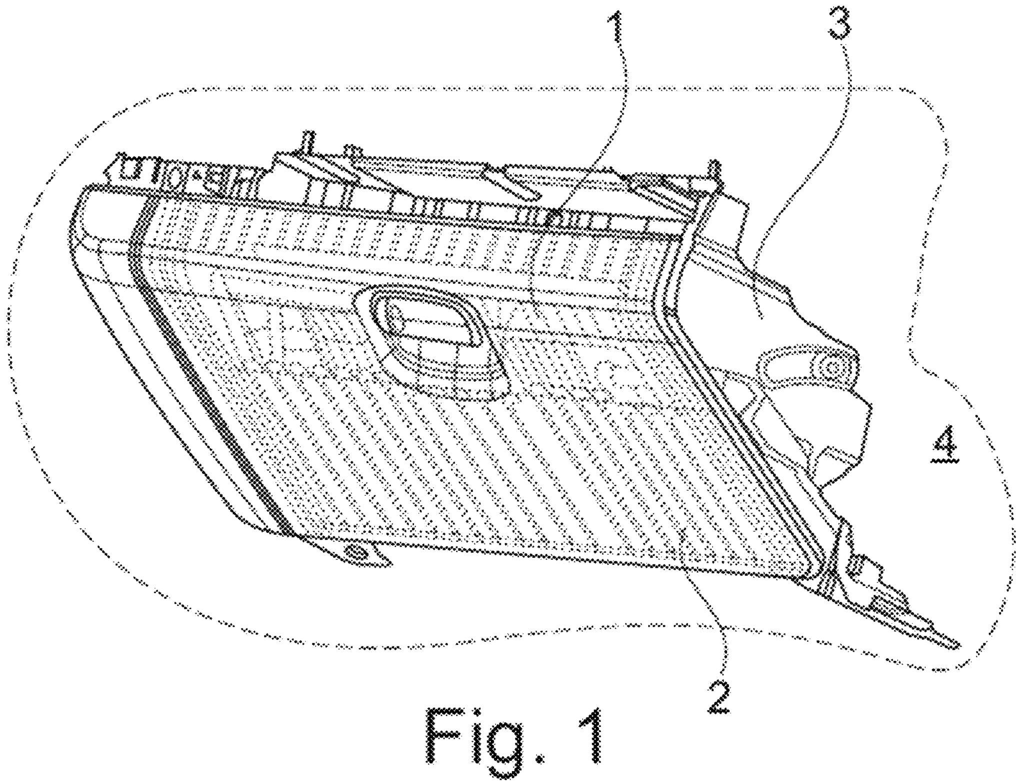
FIG. 1 is a perspective view of an exemplary storage compartment for a vehicle, further illustrating an exemplary access door of the storage compartment in a closed position with an exemplary latch assembly.

The following description is merely exemplary in nature and is not intended to limit the present disclosure, application, or uses. It should be understood that throughout the drawings, corresponding reference numerals indicate like or corresponding parts and features.

As required, one or more detailed embodiments of the present disclosure are disclosed herein, however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Furthermore, the use of a singular term, such as, "a" is not to be interpreted as limiting the number of components or details of particular components. Additionally, various terms and/or phrases describing or indicating a position or directional reference such as, but not limited to, "top", "bottom", "front", "rear", "forward", "rearward", "end", "outer", "inner", "left", "right", "vertical", "horizontal", etc. may relate to one or more particular components as seen generally from a user's vantage point during use or operation, and such terms and/or phrases are not to be interpreted as limiting, but merely as a representative basis for describing the disclosure to one skilled in the art.

FIG. 1 illustrates a storage compartment 3 such as a glove box for a vehicle 4 (generally indicated by dotted lines around the storage compartment 3). The storage compartment 3 has an access door 2 configured to be moveable between an open position (not shown) and closed position (shown in FIG. 1). The access door 2 includes an automatic latch assembly 1, which enables the access door 2 to be placed and retained in the closed position shown in FIG. 1.

Figure 2:
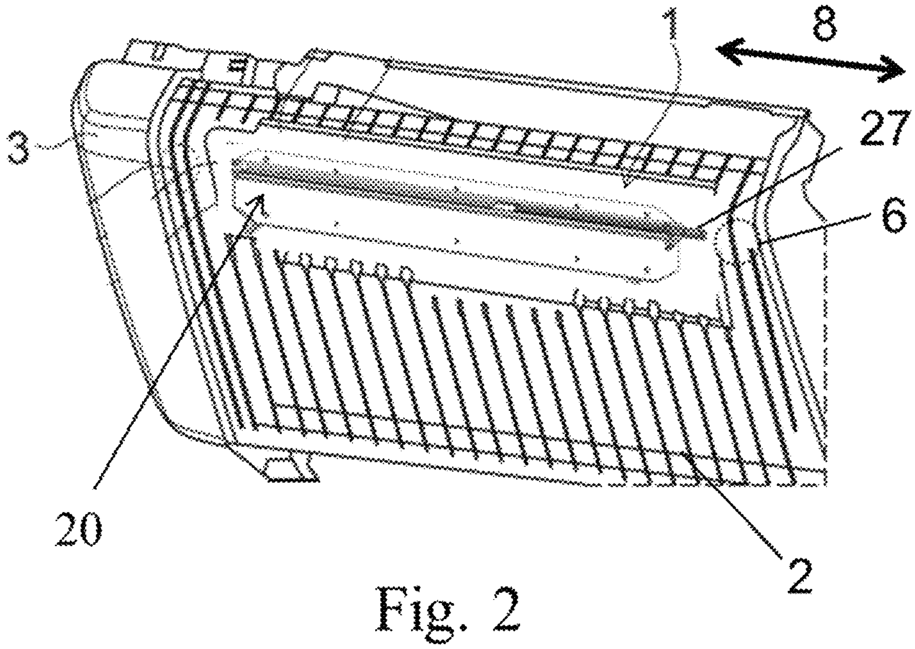
FIG. 2 is a perspective view of the storage compartment shown in FIG. 1, further illustrating the access door of the storage compartment with an outer cover removed to show an exemplary latch assembly with an exemplary automatic locking mechanism disposed within the access door.

In FIG. 2, the access door 2 is shown cut away to expose the latch assembly 1. The latch assembly 1 comprises an SMA actuator 20 operably coupled to the access door 2 and to a locking bar 27. The SMA actuator 20 and the locking bar 27 are configured to be moveable between an engaged and disengaged position. To enable the engaged position, the locking bar 27 is moved along a transversal direction indicated by arrow 8 into an opening 6 of the storage compartment 3. The locking bar 27 then retains the access door 2 in a locked closed position. The locking bar 27 may also connect to an additional locking feature (not shown). In the disengaged position, the locking bar 27 is retracted from the opening 6 allowing the access door 2 to become accessible for opening. The locking bar 27 may also be utilized to operably engage an additional locking feature (not shown) in the storage compartment 3 through the opening 6 within the scope of this disclosure. This additional locking feature would be engaged and disengaged by the locking bar 27 to secure the access door 2.

Figure 3A:
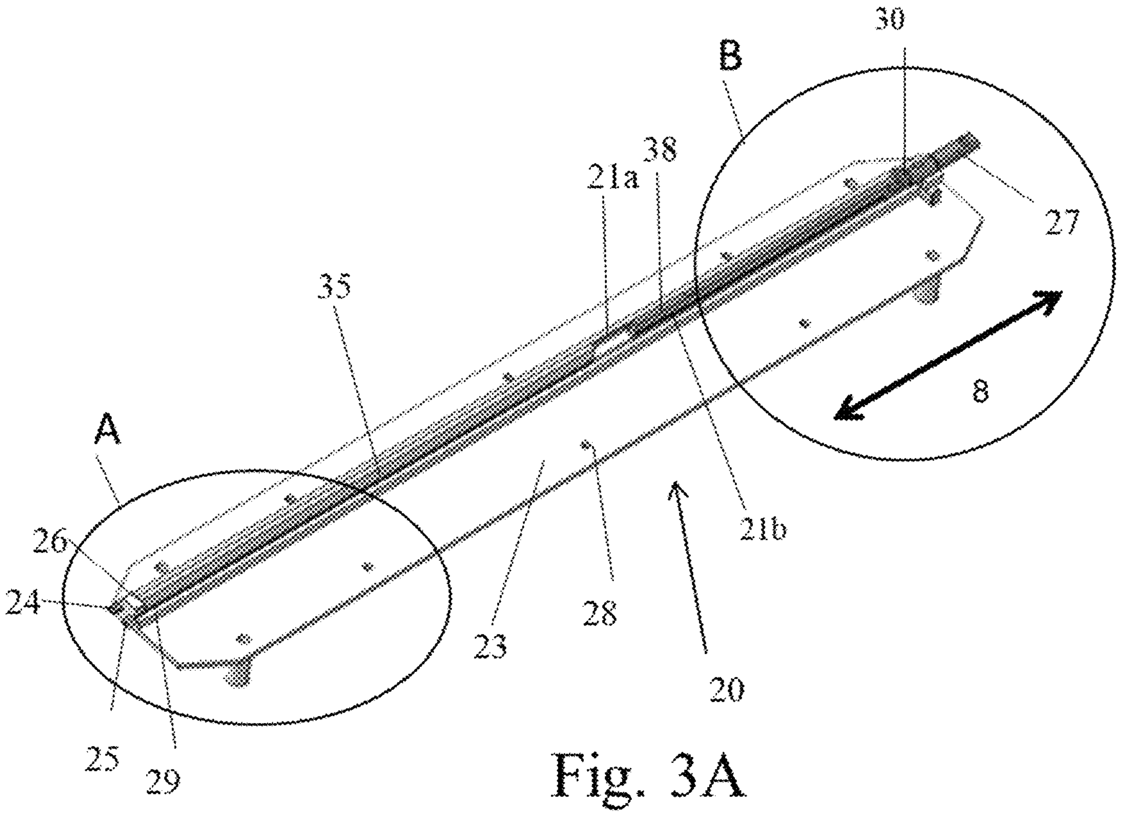
FIG. 3A is a perspective view of an exemplary shape memory alloy (SMA) actuator of the automatic locking mechanism of the latch assembly shown in FIG. 2, further illustrating internal components of the SMA actuator.
Figure 3B:
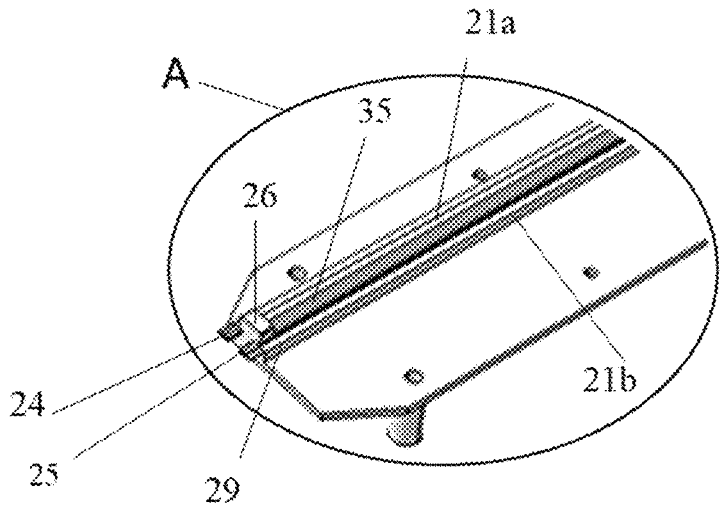
FIG. 3B is a perspective view of an enlarged portion A of the exemplary shape memory alloy (SMA) actuator of the automatic locking mechanism of the latch assembly shown in FIG. 3A according to the present disclosure.
Figure 3C:
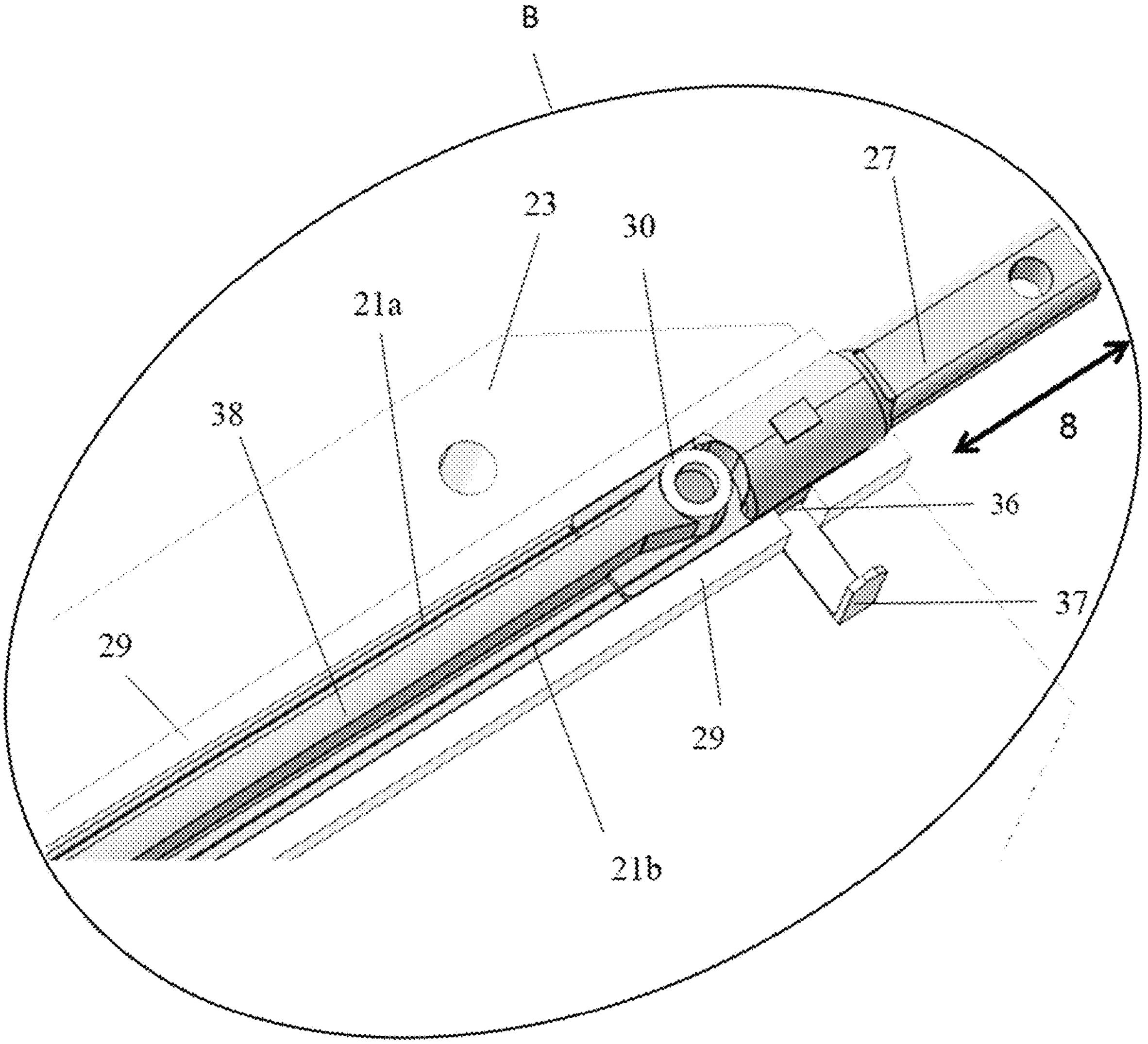
FIG. 3C is a perspective view of an enlarged portion B of the exemplary shape memory alloy (SMA) actuator of the automatic locking mechanism of the latch assembly shown in FIG. 3A according to the present disclosure.

FIG. 3A, FIG. 3B and FIG. 3C all illustrate the exemplary latch assembly 1 with the locking bar 27 and the SMA actuator 20. In FIG. 3A, the SMA actuator 20 includes a single SMA wire 21. The SMA wire 21 is electrically divided into a first SMA wire section 21*a* and a second SMA wire section 21*b* by a conductive pulley 30. The conductive pulley 30 is operably connected to the locking bar 27 and is configured to move the locking bar 27 into the disengaged position when the SMA wire 21 is electrically energized. The diameter of the SMA wire 21 can be between 0.05 mm and 0.5 mm, preferably 0.19 mm. The SMA actuator 20 has a support structure 23 for attachment at the access door 2 using fasteners such as screws inserted in apertures 28. However, it should be understood that any fastening method may be used to attach the support structure 23 to the access door 2. The configuration of the support structure 23 may be any shape to meet the mounting space requirements of the access door 2. The support structure 23 has two shoulders 29 (best viewed in FIG. 3C) which extend along the support structure 23 creating a channel to support and guide the SMA latch assembly components. The SMA actuator 20 also includes a conductive plate 36 (FIG. 4A), a guide 35, and a piston 38.

FIG. 3A illustrates a single locking bar 27, a single pulley 30 and a single SMA wire 21 as the SMA actuator 20. In other embodiments, there may be at least one additional locking bar 27 with a corresponding pulley 30 and single SMA wire 21 included in the SMA actuator 20.

FIG. 3B illustrates an enlarged view A of the latch assembly 1. The single SMA wire 21 is attached at a first end to an electrical contact 24, guided around the conductive pulley 30 and attached at a second end to a further electrical contact 25. In this form, the contact with the conductive pulley 30 is made at the approximate midpoint of the SMA wire 21 creating generally equal lengths for the first SMA wire section 21*a* and the second SMA wire section 21*b*.

The conductive pulley 30 may be made entirely from an electrically conductive material or the conductive pulley may only have an exposed select conductive material exterior section which makes contact the SMA wire 21 and with the conductive plate 36 (FIG. 4A) The pulley 30 receives current from a power supply (not shown) and transfers the electric current to the SMA wire 21 when the SMA actuator 20 is energized. This arrangement creates a first electrical circuit in the first SMA wire section 21*a* between the conductive pulley 30 and the electrical contact 24 and a second electrical circuit in the second SMA wire section 21*b* between the conductive pulley 30 and the electrical contact 25. The first and second SMA wire sections 21*a*, 21*b* receive current from the conductive pulley 30 along the each respective SMA wire section 21*a*, 21*b* to the respective attached electrical contact 24, 25. The electrical contacts 24, 25 are preferably crimp contacts.

The generally parallel guided configuration of the created first and second SMA wire sections 21*a*, 21*b* requires a smaller diameter of the SMA wire 21 to provide the required force to disengage the locking bar 27 than the diameter of a single SMA wire circuit for the same required force. A smaller SMA wire diameter allows the SMA actuator 20 to operate at a lower overall voltage requirement. The SMA actuator 20 of this disclosure utilizes a voltage between 9-16 Volts, preferably 12 V, applied to each SMA wire section 21*a* and 21*b*. This voltage range is capable of being supplied by a vehicle battery system and allows the SMA actuator 20 to function in both a vehicle key on and key off states. A smaller wire diameter also decreases the system cycle time by a reduction in the wire cooling times and an increase in internal wire resistance.

FIG. 3B, which is an enlarged view of an area A shown in FIG. 3A, illustrates that the electrical contacts 24 and 25 are attached to a connector 26. The first end of the SMA wire 21 is connected to the electrical contact 24 and the second end of the SMA wire 21 is shown connected to the electrical contact 25. The electrical contacts 24 and 25 both carry a positive charge between 9 to 16 Volts optimally at 12 Volts acting as positive terminals when the SMA actuator 20 is electrically energized and are attached to the connector 26.

The connector 26 is affixed to the guide 35 placed between the first and second SMA wire sections 21*a*, 21*b*. The connector 26 may alternatively be attached directly to the support structure 23. The guide 35 also may provide for a physical separation barrier between the first and second SMA wire sections 21*a*, 21*b* and is constructed from a non-conductive material. The guide 35 may be utilized to provide a physical stop for the piston 38.

FIG. 3C is an enlarged view of an area B shown in FIG. 3A. In this figure, the SMA wire 21 is illustrated in more detail around the conductive pulley 30 with the generally parallel first and second SMA wire sections 21*a*, 21*b*. The pulley 30 operably cooperates with the locking bar 27 and the piston 38 to provide translation of the locking bar 27 between the shoulders 29 to a disengaged position during the actuation of the SMA actuator 20. In this form, the locking bar 27 is attached to the pulley 30, but may also be connected to the piston 38 in another form. The locking bar 27 allows for the SMA wire 21 to be placed around the pulley 30 without contact with the locking bar 27. The locking bar 27 and the piston 38 are constructed of a non-conductive material.

The conductive plate 36 (FIG. 4A) is attached to or embedded in the support structure 23 between the shoulders 29. The top surface of the plate 36 is flush with a channel bottom 42 (FIG. 4A) of the support structure 23. The flush mounting arrangement creates an unobstructed surface transition between the channel bottom 42 and the plate 36 for the pulley 30 to travel (FIG. 4A).

Figure 5:
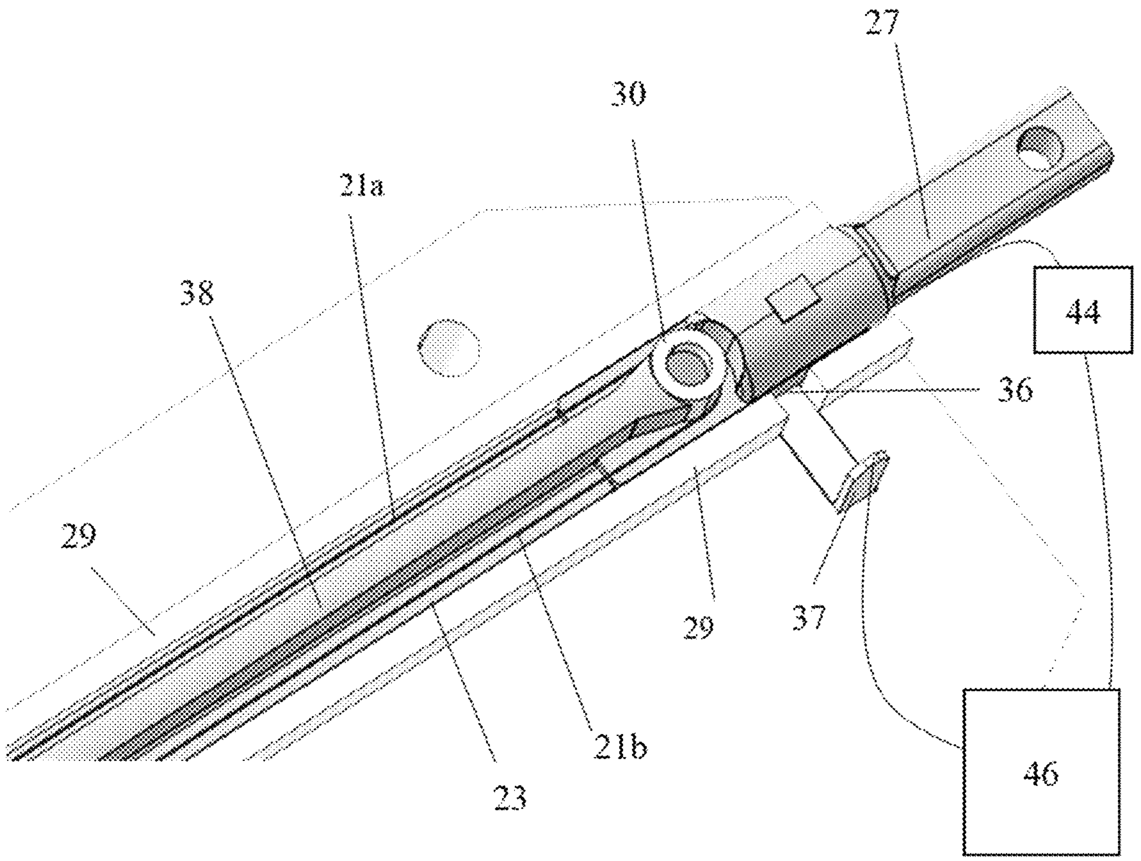
FIG. 5 is a perspective view illustrating another exemplary shape memory alloy (SMA) actuator latching system that may be disposed within an access door of a storage compartment for a vehicle according the present disclosure.

The pulley 30 and the plate 36 are constructed of an electrically conductive material and are capable of transmitting an applied current. The pulley 30 in cooperation with the plate 36 creates a common point ground acting as a negative pole for the SMA wire sections 21*a* and 21*b* when the SMA actuator 20 is energized and power is supplied to the plate 36. In this form, the common point ground effectively defines the current between the negative pole conductive pulley 30 and the positively charged poles at the electrical ends 24, 25 into the two circuits described above for SMA first and second wire sections 21*a*, 21*b*. The first and second SMA wire sections 21*a*, 21*b* then may be operated with a 50% reduction of the voltage (9-16 Volts) at both ends and at the pulley 30 over single SMA circuit system. The plate 36 contains a connector 37, which is grounded and connected to a controller such as an ECU 46 (FIG. 5).

Figure 4A:
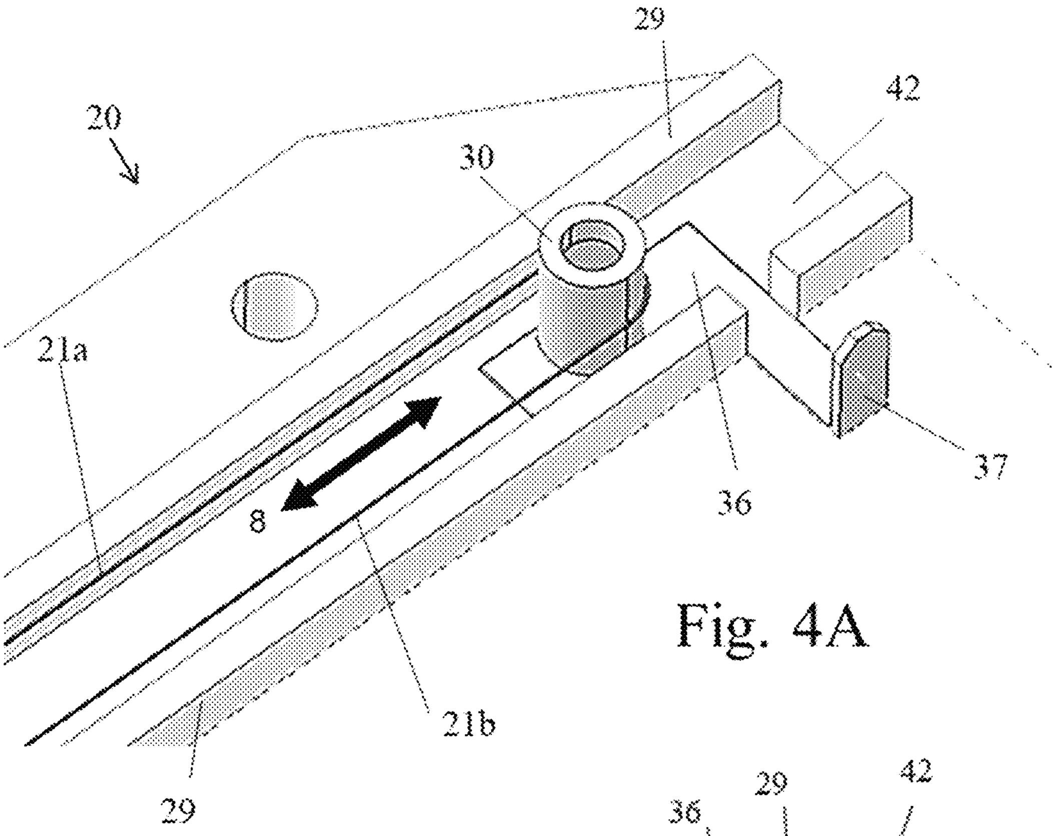
FIG. 4A is a perspective view of the exemplary shape memory alloy (SMA) actuator in an engaged position according to the present disclosure.
Figure 4B:
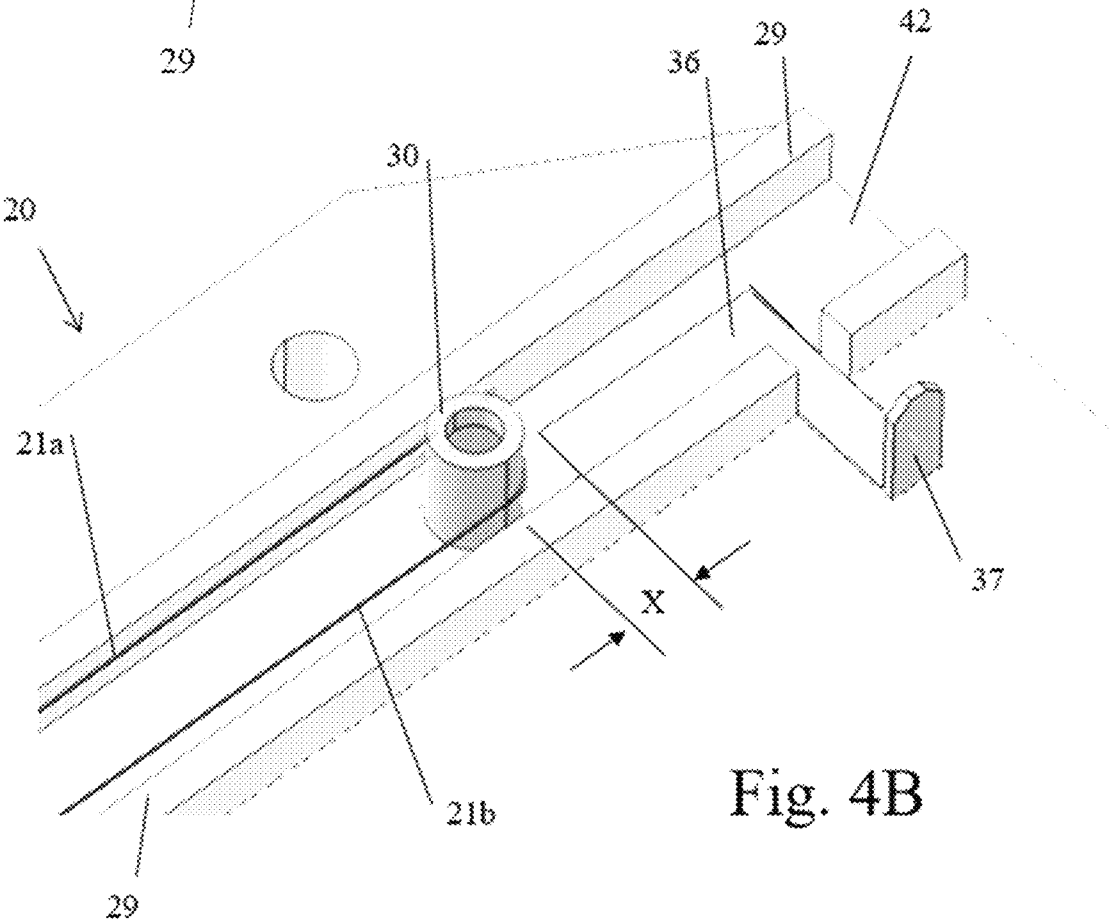
FIG. 4B is a perspective view of the pulley of the exemplary shape memory alloy (SMA) actuator in a disengaged position according to the present disclosure.

FIG. 4A and FIG. 4B illustrate the SMA actuator 20 of area B shown in FIG. 3A. For illustrative purposes, the locking bar 27 and the piston 38 are not shown in FIG. 4A and FIG. 4B. The conductive pulley 30 is shown in contact with the plate 36 in FIG. 4A as an exemplary latch engaged position. FIG. 4B illustrates the translated position of pulley 30 in contact with the channel bottom 42 in the exemplary latch disengaged position.

In FIG. 4A, the conductive pulley 30 is in contact with the plate 36 completing the electrical circuit for the circuit the SMA wire sections 21*a* and 21*b*. When the circuit is energized the current flow will heat and shorten in length the SMA wire sections 21*a* and 21*b* applying a translational force to the pulley 30. The translational force slides the pulley 30 between the shoulders 29 toward the electrical contacts 24, 25 and along the plate 36. The locking bar 27 is translated with the pulley 30 to a disengaged position from the opening 6 in the storage compartment 3 (FIG. 2) allowing access to the access door 2 (FIG. 3A). The distance the pulley 30 must travel to disengage the locking bar 27 may vary depending on the design requirements of the storage compartment 3.

In a first variation, the first and second SMA wire sections 21*a* and 21*b* are shorten to a preset determined length. The shortened first and second SMA wire sections 21*a* and 21*b* translates the pulley 30, causing the pulley 30 to move off the plate 36 onto the non-conductive channel bottom 42 shown in FIG. 4B. The loss of contact between the pulley 30 and the plate 36 interrupts the electrical circuit providing current to the SMA wire sections 21*a* and 21*b*. The movement of the pulley 30 off the plate 36 in effect creates an electrical limit switch and an active switch-off circuit for the SMA actuator 20.

The ECU 46 (FIG. 5) switches off the power supply in parallel with the detection of the loss of contact between the pulley 30 and the plate 36. Once the circuit is de-energized with the loss of electrical contact between the pulley 30 and the plate 36, the SMA wire sections 21*a* and 21*b* will cool causing the SMA wire sections 21*a* and 21*b* to lengthen returning the pulley 30, the piston 38, and the locking bar 27 to the engaged and locked position when the piston 38 is attached to a return biasing element (not shown). The return biasing element in this form is a spring positioned between the guide 35 and the piston 38 but maybe any biasing element to provide a return force to the piston 38 to return the pulley 30 and the locking bar 27 to the engaged position. The power supply remains off as the pulley 30 reestablishes contact with the plate 36 preventing continuous switching on and off the current as the pulley 30 is translated on and off the plate 36.

Activation of the current to the SMA wire sections 21*a* and 21*b* to provide disengagement of the locking bar 27 may be initiated by the ECU 46 when an input state is received from a vehicle input state or from a user input obtained from a key fob, an HMI screen or a switch/button. A key fob signal to the ECU 46 would allow the user to open the access door 2 without starting the vehicle or opening the correct menu on the HMI screen. A key fob activation may also allow access when the passenger door is unlocked or as a stand-alone function. Such a key fob arrangement may be implemented in this exemplary way of using one button for unlocking the storage compartment 3 but if a second button was pressed at the same time a vehicle door and the storage compartment may be unlocked simultaneously. This would allow for the user to gain access to the storage compartment 3 from the passenger side of the vehicle without the vehicle being started.

The pulley 30 includes a pulley biasing element (not shown) preferably but not limited to a spring contact. The pulley biasing element ensures that the conductive pulley 30 remains in contact with the conductive plate 36 and the channel bottom 42 as the pulley 30 translates from the engaged and the disengaged position. The pulley biasing element (not shown) also ensures that the conductive pulley 30 maintains electrical contact as it translates along plate 36 allowing the conductive pulley 30 to receive current when the SMA actuator system is energized.

The dimension X (FIG. 4B) is a translated distance by the pulley 30 after losing contact with the plate 36 breaking the electrical circuit to SMA wire sections 21*a* and 21*b*. This distance is a designed parameter of the system. The dimension X is the distance required to allow the electronic control unit (ECU) 46 to detect the pulley 30 loss of contact with plate 36 and to instruct the electrical power to be turned off to the plate 36 before the SMA wires sections 21*a* and 21*b* cool and return the pulley 30 to contact the plate 36. The processing speed of the ECU 46 is one parameter which affects the implemented dimension X needed to detect the circuit interruption and switch off the power. The speed at which the SMA wire sections 21*a* and 21*b* shorten and lengthen affects the speed the conductive pulley 30 and the dimension X. The bias force of the return biasing element (not shown) for the piston 38 will affect the translation force of the SMA wire sections 21*a* and 21*b* to move the pulley 30 and affect the distance X.

FIG. 5 illustrates another variation of the SMA actuator 20. In some design settings, parameters for heating time of the SMA wire sections 21*a*, 21*b*, the ECU processing speed, and vehicle vibration may affect the deactivation of the circuit by the movement of the pulley 30 of the plate 36. As an alternate to the active off switch created by the translating pulley 30 describe above, a switch 44, preferably a microswitch, may be utilized to control the electrical current supplied to the SMA wire sections 21*a* and 21*b*. The conductive pulley 30 in cooperation with the plate 36 provides current to the SMA wire sections 21*a* and 21*b* as described above but in this form, the pulley 30 maintains an electrical connection to the plate 36 during the engaging and disengaging cycles. The switch 44 may be connected as a limit type switch to the system such as at the piston 38 or locking bar 27 and detects when an unlocking distance has been achieved.

FIG. 5 illustrates an exemplary placement of the switch 44, but it is within the scope of this disclosure to place the switch 44 in other positions or utilize other know types of methods and parameters to determine the activation of the switch 44. Once the switch 44 has been activated, the ECU 46 will discontinue electrical current to the plate 36 turning off the electrical current to the pulley 30 and the SMA wire sections 21*a* and 21*b*. This will allow the SMA wire sections 21*a* and 21*b* to cool and return to the pulley 30 to the engaged position as described above. In another variation, the circuit could be designed as an active switch-on circuit. In this case, the circuit would only be switched on when the switch, for example a limit switch or a microswitch, is switched off. The switch 44 may also be used in combination with the active off switch described in FIGS. 4A and 4B and remain within the scope of this disclosure.

To optimize the SMA wire 21 for use in the SMA actuator 20, the force needed to disengage the locking bar 27 is first calculated. Then a length and a diameter of SMA wire 21 is determined based on providing half the force required to move the locking bar 27. The length of the SMA wire 21 is then doubled and the common point ground (pulley 30 and plate 36) is created around the midpoint of the SMA wire 21. A voltage (between 9-16V, preferably 12V) is applied to both ends of the SMA wire 21 and the pulley 30 with the plate 36 (ground) at the turning point of the SMA wire 21. This halves the voltage for each half of the SMA wire sections 21*a* and 21*b* and the SMA wire halves can become thinner to decrease the cooling times even in multiple operations.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features of the invention disclosed in the foregoing description, in the drawings and in the claims can be essential both individually and in any combination for the implementation of the invention in its various embodiments.

REFERENCE SIGN LIST

1 Latch assembly
2 Access door
3 Storage compartment
4 Vehicle
6 Opening
8 Arrow
20 SMA actuator
21 SMA Wire
21*a* First section of SMA wire 21
21*b* Second section of SMA wire 21
23 Support structure
24 Electrical contact
25 Electrical contact
26 Connector
27 Locking bar
28 Aperture
29 Shoulder
30 Pulley
35 Guide
36 Plate
37 Connector
38 Piston
40 Connector
42 Channel bottom
44 Switch
46 ECU

The invention claimed is:

1. A latch assembly, comprising:
at least one locking bar configured to be movable into
(i) an engaged configuration with a storage compartment of a vehicle which enables an access door to be placed and held into a closed position and
(ii) a disengaged configuration with the storage compartment to be placed into an opened position; and
at least one shape memory alloy (SMA) actuator, wherein
the SMA actuator is configured to move the locking bar into the disengaged configuration to permit the access door of the storage compartment in the vehicle to open or be opened,
the SMA actuator comprises at least one SMA wire guided around at least one translatable conductive pulley,
the SMA actuator becomes electrically energized when power is supplied to a plate and the conductive pulley is in electrical contact with the plate, and
the SMA actuator becomes electrically de-energized when the conductive pulley is translated off the plate.

2. The latch assembly of claim 1, wherein
the SMA wire comprises a first end and a second end, each being connected to a respective electrical contact, and
wherein at least one of,
the conductive pulley is at an approximate midpoint of the SMA wire, and
the first end and the second end of the SMA wire are positive terminals and the conductive pulley is a negative terminal.

3. The latch assembly of claim 2, wherein
the SMA wire is electrically divided into a first SMA wire section and a second SMA wire section by the conductive pulley, and
a first electrical circuit is created in the first SMA wire section between the conductive pulley and the respective electrical contact and a second electrical circuit is created in the second SMA wire section between the conductive pulley and the electrical contact.

4. The latch assembly of claim 3, wherein
the first and second SMA wire sections each receive current from the conductive pulley along the respective SMA wire section to the respective attached electrical contact, and
a voltage for the first and second wire circuits is between 9 and 16 Volts.

5. The latch assembly of claim 1, further comprising
a conductive plate, wherein the at least one SMA actuator becomes electrically energized when power is supplied to the plate and the conductive pulley is in electrical contact with the plate.

6. The latch assembly of claim 5, wherein
the at least one SMA actuator becomes de-energized when the conductive pulley is translated and/or moved off the plate.

7. The latch assembly of claim 1, wherein
the at least one SMA actuator is adapted to become electrically energized upon a user initiated input, and
a switch is provided to initiate energizing or de-energizing of the at least one SMA actuator.

8. The latch assembly of claim 1, further comprising
at least one locking feature which is operably engaged by the locking bar to retain the access door.

9. A latch assembly of claim 1, further comprising
a connector attached to a support structure for attachment at the access door,
wherein the first and second ends of the SMA wire are connected to the connector.

10. The latch assembly of claim 9, wherein
the support structure has two shoulders which extend along the support structure creating a channel to support and guide the SMA latch assembly components.

11. The latch assembly of claim 9, further comprising
a guide and a piston,
wherein at least one of:
the connector is affixed to the guide, which is placed between the first and second SMA wire sections,
the guide is provided for a physical separation barrier between the first and second SMA wire sections,
the guide is constructed from a non-conductive material, and
the guide provides a physical stop for the piston.

12. The latch assembly of claim 11, wherein the pulley operably cooperates with the locking bar and the piston to provide translation of the locking bar between the shoulders to a disengaged position during the actuation of the SMA actuator, wherein at least one of:

the locking bar is attached to the pulley or the piston, and the locking bar and the piston are constructed of a non-conductive material.

13. The latch assembly of claim 11, further comprising a return biasing element positioned between the guide and the piston to provide a return force to the piston to return the pulley and the locking bar to the engaged position.

14. The latch assembly of claim 9, wherein the conductive plate is attached to or embedded in the support structure, and the top surface of the plate is flush with a channel bottom of the support structure, which is non-conductive.

15. A vehicle storage compartment with the latch assembly of claim 1.

16. A method of activation and deactivation of the latch assembly of claim 1, comprising:

electrically charging a plate wherein a conductive pulley operably attached to a locking bar is electrically energized when in contact with the plate; and creating a first electrical circuit between the conductive pulley and a first end of an SMA wire and a second electrical circuit between the conductive pulley and the second end of the SMA wire upon power received by the conductive pulley;

wherein power provided to the first electrical circuit and the second electrical circuit provides shortening to the SMA wire translating the conductive pulley off the plate and interrupting power to the conductive pulley.

17. The method of claim 16, further comprising detecting the conductive pulley translated off the plate for deactivating the power supplied to the plate.

18. The method of claim 16, further comprising detecting the translation of the conductive pulley and/or the locking bar, and deactivating the power supplied to the plate via a switch.

19. The method of claim 16, further comprising calculating the force needed to disengage the locking bar for determining length and diameter of the SMA wire based on providing half the force required to move the locking bar.

20. The method of claim 16, further comprising applying a voltage to both ends of the SMA wire and the pulley with the plate.

* * * * *